United States Patent
Kulshreshtha et al.

(10) Patent No.: US 10,756,949 B2
(45) Date of Patent: Aug. 25, 2020

(54) LOG FILE PROCESSING FOR ROOT CAUSE ANALYSIS OF A NETWORK FABRIC

(71) Applicant: Cisco Technology, Inc., San Jose, CA (US)

(72) Inventors: Ashutosh Kulshreshtha, Cupertino, CA (US); Andy Sloane, Pleasanton, CA (US); Navindra Yadav, Cupertino, CA (US); Oliver Kempe, Santa Clara, CA (US); Uday Krishnaswamy Chettiar, Redwood City, CA (US); Vimal Jeyakumar, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 231 days.

(21) Appl. No.: 15/834,865

(22) Filed: Dec. 7, 2017

(65) Prior Publication Data
US 2019/0182101 A1    Jun. 13, 2019

(51) Int. Cl.
*H04L 12/24* (2006.01)

(52) U.S. Cl.
CPC ........ *H04L 41/0631* (2013.01); *H04L 41/069* (2013.01); *H04L 41/0622* (2013.01); *H04L 41/5009* (2013.01); *H04L 41/22* (2013.01)

(58) Field of Classification Search
CPC ............. H04L 41/0622; H04L 41/0631; H04L 41/069; H04L 41/22; H04L 41/5009
See application file for complete search history.

(56) References Cited

U.S. PATENT DOCUMENTS

| | | | | |
|---|---|---|---|---|
| 6,766,368 B1* | 7/2004 | Jakobson | ............ | H04L 41/0233 367/39 |
| 7,721,152 B1* | 5/2010 | Joshi | ................... | G06F 11/0709 714/15 |
| 9,438,645 B2 | 9/2016 | Stern et al. | | |
| 9,697,100 B2 | 7/2017 | Puri et al. | | |
| 2003/0188189 A1 | 10/2003 | Desai et al. | | |
| 2011/0185234 A1* | 7/2011 | Cohen | ................... | G06F 16/285 714/37 |
| 2011/0296244 A1* | 12/2011 | Fu | ....................... | G06F 11/3608 714/37 |
| 2011/0314148 A1* | 12/2011 | Petersen | ............. | G06F 11/3476 709/224 |
| 2014/0165207 A1* | 6/2014 | Engel | ..................... | H04L 43/04 726/25 |

(Continued)

OTHER PUBLICATIONS

Marvasti et al., "An Anomaly Event Correlation Engine: Identifying Root Causes, Bottlenecks, and Black Swans in IT Environments," Technical Journal 2013, labs.vmware.com, pp. 1-29.

*Primary Examiner* — Alina A Boutah
(74) *Attorney, Agent, or Firm* — Polsinelli PC

(57) ABSTRACT

The disclosed technology relates to log file processing techniques for root cause analysis of a network fabric. A system may be configured to identify a feature of interest in a log file and calculating an abnormal level for the feature of interest. The system is further configured to detect that a performance event has occurred during a time period, determine whether the feature of interest is at the abnormal level during the time period, and identify a correlation between the feature of interest and the performance event based on the determining.

20 Claims, 5 Drawing Sheets

(56) References Cited

U.S. PATENT DOCUMENTS

| | | | |
|---|---|---|---|
| 2014/0172919 A1* | 6/2014 | Johnston | H04L 41/069 |
| | | | 707/797 |
| 2015/0317318 A1* | 11/2015 | Hadzhiyski | G06F 16/90332 |
| | | | 707/752 |
| 2016/0098402 A1* | 4/2016 | Filippi | H04L 41/0631 |
| | | | 707/722 |
| 2016/0292166 A1 | 10/2016 | Russell | |
| 2017/0192872 A1* | 7/2017 | Awad | G06F 11/3072 |
| 2017/0262297 A1* | 9/2017 | Hosabettu | G06F 9/4411 |
| 2017/0277997 A1* | 9/2017 | Zong | G06F 16/2477 |
| 2017/0300532 A1* | 10/2017 | Simhon | G06F 11/0751 |
| 2018/0034685 A1* | 2/2018 | Naous | H04L 43/028 |
| 2018/0091376 A1* | 3/2018 | Ramakrishna | H04L 41/142 |
| 2018/0285397 A1* | 10/2018 | Huang | G06F 16/86 |
| 2019/0095265 A1* | 3/2019 | Dome | G06F 11/3419 |
| 2019/0124099 A1* | 4/2019 | Matselyukh | H04L 43/16 |
| 2019/0179691 A1* | 6/2019 | Xu | G06K 9/6885 |

\* cited by examiner

LOG FILE PROCESSING FOR ROOT CAUSE ANALYSIS OF A NETWORK FABRIC

TECHNICAL FIELD

The subject matter of this disclosure relates in general to the field of computer networks, and more specifically for management of networked entities and resources.

BACKGROUND

A network administrator may be responsible for managing a large number of networked entities and resources distributed across one or more networks. These entities may be physical entities or logical entities. For example, the entities may include nodes, endpoints, machines, virtual machines, containers (an instance of container-based virtualization), tenants, endpoint groups, and applications. These entities may be organized and interact with one another to perform one or more functions, provide one or more services, and/or support one or more applications. These entities may also be grouped in various ways, located in different geographical locations, and/or serve different functions.

A thorough understanding of the networked entities and their configuration is critical for ensuring smooth operation, troubleshooting problems, detecting anomalous activity in the network environment (e.g., network attacks and misconfiguration), application and infrastructure security (e.g., preventing network breaches and reducing vulnerabilities), or asset management (e.g., monitoring, capacity planning, consolidation, migration, and continuity planning). Traditional approaches for managing large network infrastructures require comprehensive knowledge on the part of highly specialized human operators because of the complexities of the interrelationships among the entities. When confronted with a problem in the network, these human operators manually experiment with large datasets to tease out possible causes and eliminate them one by one until an actual cause is found.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
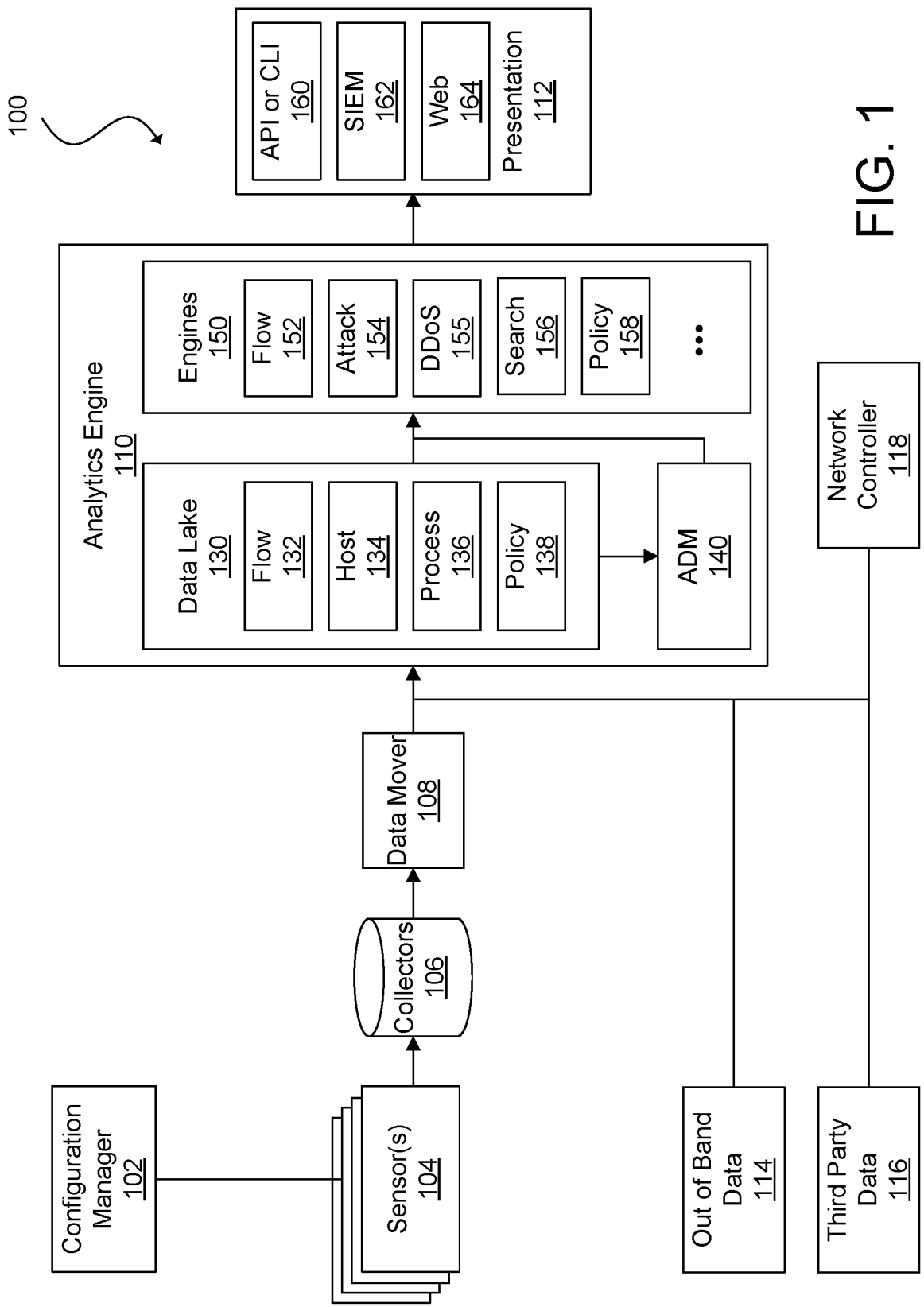
FIG. 1 is a conceptual block diagram illustrating an example network monitoring system, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various aspects of the subject technology relate to using log file processing techniques for root cause analysis of a network fabric. A system may be configured to identify a feature of interest in a log file and calculating an abnormal level for the feature of interest. The system is further configured to detect that a performance event has occurred during a time period, determine whether the feature of interest is at the abnormal level during the time period, and identify a correlation between the feature of interest and the performance event based on the determining.

Example Embodiments

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Various entities in a networked environment (e.g., a network fabric, a data center, etc.) are often configured to interact with one another or external entities to perform one or more functions, provide one or more services, and/or support one or more applications. When an issue arises with respect to the performance of one of these functions, services, or functions, a highly specialized human operator (e.g., an IT or network administrator) with comprehensive knowledge of the complexities and interrelationships among entities is often needed to identify correlated factors. For example, when a problem in the network occurs, an administrator may need to sift through large quantities of data and guess at what might be a root cause of the problem. Only when a cause is determined can actions be taken to resolve the issue. Furthermore, as the complexity of the networks increases and technologies such as micro-services and distributed or cloud environments are used, it becomes more and more difficult to perform root cause analysis.

The disclosed technology addresses the need in the art for a more effective way to identify root causes or contributing factors to an observed outcome (e.g., a problem detected by a networked agent, key performance indicator, or other condition) in a network environment. More specifically, various embodiments relate to leveraging one or more log files generated in the network environment to identify features of interest, monitor those features of interest over time to identify normal and/or abnormal levels for those features of interest, and identify correlations between those features of interest and some observed event (e.g., a performance event associated with a function, service, or application supported by the network environment).

Network environments such as data centers, network fabrics, or other networks may generate various log files as a result of the operations. Log files may include, for example, web logs, application logs, database query logs, debugging/error logs, or other types of logs. The log files may record various events such as a user or entity associated with the event, performance metrics associated with the event (e.g., computing resources used, execution time, response time, processor load, memory usage, bandwidth usage, etc.), or other data associated with the event that may be collected in the network environment and stored in one or more log files. The event may be, for example, an action, a query, a detected set of conditions, or other type of event. Furthermore the log files may include time series data or associated with timestamps associated with a particular event that is recorded in the log file.

However, there are many technical issues with working with log files. For example, log files contain a large amount of data that may or may not relate to an observed outcome and the log files may contain structured data, unstructured data, or a combination. Accordingly, it is difficult to efficiently determine which features in a log file are relevant. Aspects of the subject technology address these and other technical issues by, for example, identifying correlations between the log file and an observed outcome by identifying features of interest in the log file. This reduces the computing resources (e.g., processor time, bandwidth, memory usage) required as well as improves response time.

Aspects of the subject technology relate to finding correlations between an identified issue and potential root causes based on log file analysis. A system may be configured to identify a log file based on configuration data (e.g., a list of one or more known locations for log files and/or known log file filenames). In some cases there may be no configuration data and, as a result, traditional computing devices are unable to identify whether a file or document is a log file. Accordingly, some aspects relate to identifying a file log by tracking files accessed by a machine, determining whether the file size increases steadily over time, and determining that the contents of the file are text data and not other types of data (e.g., image data).

The system analyzes the log file to identify features of interest in the log file. The feature of interest may be a pattern or a portion of a pattern. The pattern may be specified by input from a network administrator, a file, or some other source and be provided in the form of a regular expression specifying the pattern. Alternatively, the pattern may also be identified by tracking the entropy of the log file and/or the words in the log file over time. For example, the pattern may be "user_ID: $U" where "$U" is a variable for the user name/id. Another pattern may be "query: $Q" where "$Q" is a variable value for the query name. Still another pattern may be "query response time: $T" where "$T" is a variable value for a response time for a query.

Once a feature of interest in the log file is identified, the system may track the feature of interest over time and calculate a normal level or range for the feature of interest. For example, the normal value or range may be a frequency for a feature of interest (e.g., an average number of occurrences for a feature of interest over a unit of time) or an average value for the feature of interest (e.g., the average response time). Accordingly, abnormal levels or ranges may also be defined by the system.

When a performance event is detected, the system may attempt to correlate the performance event with the feature of interest. For example, the performance event may occur when a monitored metric (e.g., server response time) exceeds a threshold level. The threshold level may be provided by a network administrator or determined by the system based on historical values (e.g., an average or a standard deviation from the norm) for the metric. When the performance event is detected, the system may determine whether any of the features of interest being monitored are also at abnormal levels. If the feature of interest is at an abnormal level, the feature of interest may be correlated with the performance event. Over time, the correlation between the feature of interest and the performance event may grow stronger and once a correlation is established, the feature of interest may be provided to a network administrator as a possible root cause of the performance event.

Example embodiments described herein with reference to the accompanying figures provide an improvement to one or more aspects of existing methods and systems for root cause analysis in a network environment. Root cause analysis plays an important role in the technological field of network management, internet/network security, datacenter technology, and other modern network related technologies that are rooted in computer technologies. Aspects of the subject technology reduce the time and computing resources (e.g., CPU, bandwidth, memory, etc.) needed to identify a candidate root cause of a performance outcome.

FIG. 1 is a conceptual block diagram illustrating an example network monitoring system 100, in accordance with various embodiments of the subject technology. The network monitoring system 100 can include a configuration manager 102, sensor(s) 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition can be an instance of a VM, container, sandbox, or other isolated software environment. The software environment can include an operating system and application software. For software running within a virtual partition, the virtual partition can appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 can request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that can be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container); a hypervisor or shared kernel managing one or more virtual partitions and/or physical servers, an application-specific integrated circuit (ASIC) of a switch, router, gateway, or other networking device, or a packet capture (pcap) appliance (e.g., a standalone packet monitor, a device connected to a network devices monitoring port, a device connected in series along a main trunk of a datacenter, or similar device), or other entity in a network. The sensors 104 can monitor network traffic between nodes, and send network traffic data and corresponding data (e.g., host data, process data, user data, etc.) to the collectors 108 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition, hypervisor, shared kernel, or physical server, ASIC, pcap, etc.) includes a respective sensor 104. However, it should be understood that various software and hardware configurations can be used to implement the sensor network 104.

As the sensors 104 capture communications and corresponding data, they can continuously send network traffic data to the collectors 108. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data, included as part of gathered network traffic data, for each session, bidirectional flow, flow, packet, or other more granular or less granular network communication. The additional data can include various log files generated by the sensors 104, host and/or endpoint information, virtual partition information, sensor information, process information, user information, tenant information, application information, network topology, application dependency mapping, cluster information, or other information corresponding to each flow. For example, each sensor 104 may generate one or more log files for networked entities on which they are deployed. Alternatively, or additionally, the sensors 104 may collect one or more log files that are generated by the networked entities that they are deployed on and transmit the collected log files to the collectors 106. In other embodiments, log files may also be generated or collected by other components of the network monitoring environment 100 such as by collectors 106, network controller 118, configuration manager 102, or analytics engine 110. The log files may also be provided in out of band data 114 or third party data 116.

In some embodiments, the sensors 104 can perform some preprocessing of the network traffic and corresponding data before sending the data to the collectors 108. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 can be located throughout the network, network traffic and corresponding data can be collected from multiple vantage points or multiple perspectives in the network to provide a more comprehensive view of network behavior. The capture of network traffic, log data, and corresponding data from multiple perspectives rather than just at a single sensor located in the data path or in communication with a component in the data path, allows the data to be correlated from the various data sources, which can be used as additional data points by the analytics engine 110. Further, collecting network traffic, log data, and corresponding data from multiple points of view ensures more accurate data is captured. For example, a conventional sensor network can be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors cannot be accurately monitored by the conventional sensor network. The sensor network 104 of various embodiments substantially mitigates or eliminates these issues altogether by locating sensors at multiple points of potential failure. Moreover, the network monitoring system 100 can verify multiple instances of data for a flow (e.g., source endpoint flow data, network device flow data, and endpoint flow data) against one another.

In some embodiments, the network monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source can be more likely to be more accurate than a sensor closer to the destination), a state of a sensor or a node hosting the sensor (e.g., a compromised sensor/node can have less accurate flow data than an uncompromised sensor/node), or flow data volume (e.g., a sensor capturing a greater number of packets for a flow can be more accurate than a sensor capturing a smaller number of packets).

In some embodiments, the network monitoring system 100 can assemble the most accurate flow data set and corresponding data from multiple sensors. For instance, a first sensor along a data path can capture data for a first packet of a flow but can be missing data for a second packet of the flow while the situation is reversed for a second sensor along the data path. The network monitoring system 100 can assemble data for the flow from the first packet captured by the first sensor and the second packet captured by the second sensor.

As discussed, the sensors 104 can send log data, network traffic, and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it can be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 can only serve as network storage for the network monitoring system 100. In such embodiments, the network monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it can be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set can be retained for a lengthier period of time for another set of flows identified as anomalous or as an attack.

The analytics engine 110 can generate analytics using data collected by the sensors 104. Analytics generated by the analytics engine 110 can include applicable analytics of nodes or a cluster of nodes operating in a network. For example, analytics generated by the analytics engine 110 can include one or a combination of information related to flows of data through nodes, detected attacks on a network or nodes of a network, applications at nodes or distributed across the nodes, application dependency mappings for applications at nodes, policies implemented at nodes, and actual policies enforced at nodes.

In some embodiments, the analytics engine 110 can be used to perform root cause analysis based on the various log files generated in the network monitoring environment 100. The analytics engine 110 may identify features of interest in one or more log files and monitor them over time. If a performance event is detected, the analytics engine 110 may determine the performance event is correlated with one or more of the features of interest The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as platform data for a host platform, security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 can instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address can correspond to a first endpoint (e.g., network device, physical server, virtual partition, etc.) of the network, and the destination address can correspond to a second endpoint, a multicast group, or a broadcast domain. The flow attributes 132 can also include flow log files, aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, log files associated with a host and/or endpoint, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 can be associated by platform, process, user, flow, or other more granular or less granular network element or network communication.

The process attributes 136 relate to process data corresponding to each flow, and can include process name (e.g., bash, httpd, netstat, etc.), log files associated with a process, ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy log files or policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 can include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine can be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 can further include a search engine 156. The search engine 156 can be configured, for example to perform a structured search, an NLP (Natural Language Processing) search, or a visual search. Data can be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic can correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 can analyze the input data to determine that there is first traffic flowing between external endpoints on port 80 of the first endpoints corresponding to Hypertext Transfer Protocol (HTTP) requests and responses. The input data can also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 can define an ADM for the web application as a three-tier application including a first EPG comprising the first endpoints, a second EPG comprising the second endpoints, and a third EPG comprising the third endpoints.

The presentation module 116 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it can be too voluminous for a user to navigate. The presentation module 116 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an API for the programming language Java®, which defines how a client can access a database.

In some embodiments, the SIEM interface 162 can be implemented using Hadoop®, Apache® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network monitoring system, those of skill in the art will understand that the components of the network monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
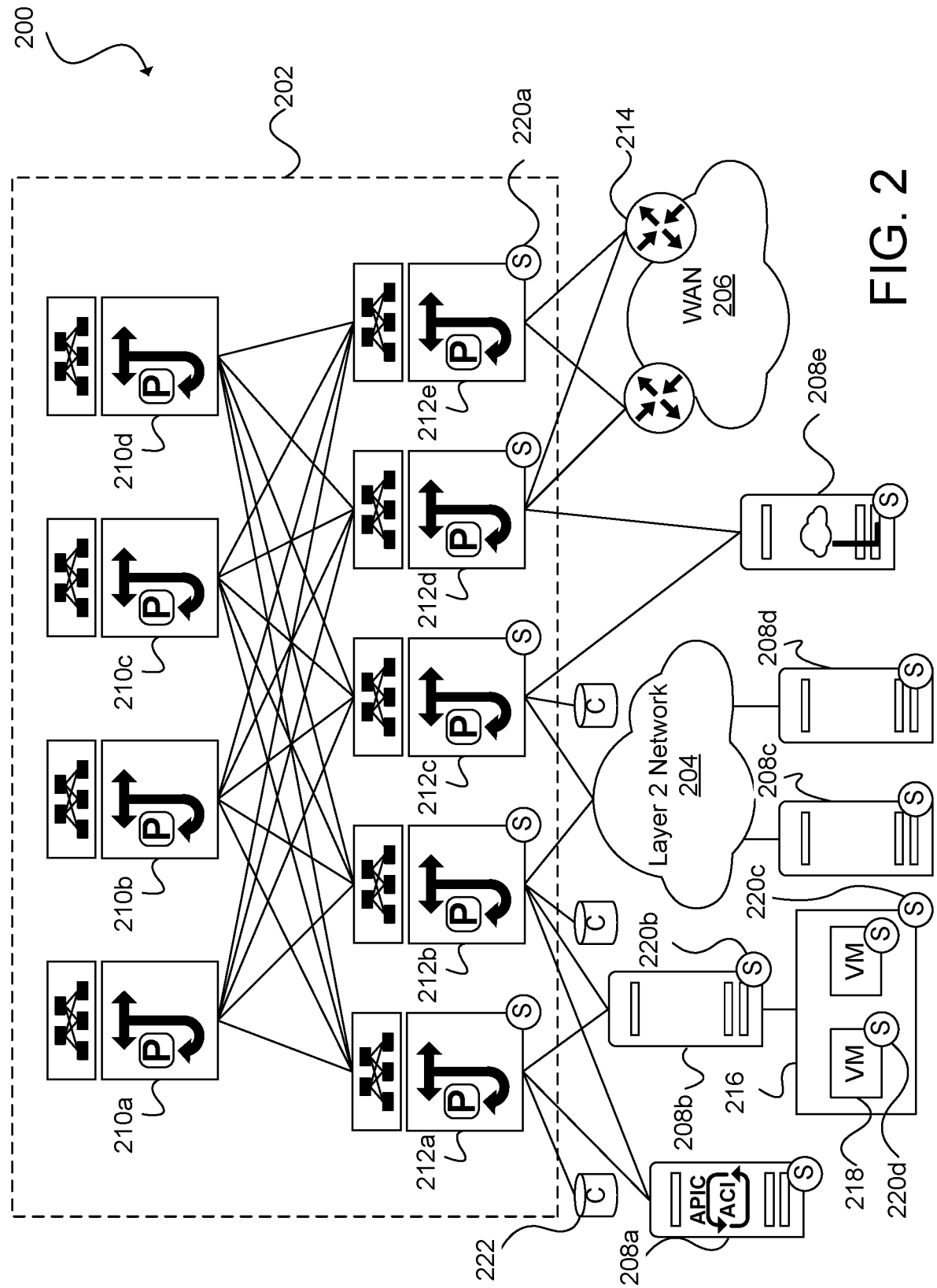
FIG. 2 illustrates an example of a network environment, in accordance with an embodiment.

FIG. 2 illustrates an example of a network environment 200, in accordance with an embodiment. In some embodiments, a network monitoring system, such as the network monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e can be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any datacenter or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture.

In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and can accommodate a large number of components, as well as more complicated arrangements and configurations. For example, the network can include any number of fabrics 202, which can be geographically dispersed or located in the same geographic area. Thus, network nodes can be used in any suitable network topology, which can include any number of servers, virtual machines or containers, switches, routers, appliances, controllers, gateways, or other nodes interconnected to form a large and complex network. Nodes can be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 can have instantiated thereon a hypervisor 216 for creating and running one or more virtual switches (not shown) and one or more virtual machines 218, as shown for the host 208b. In other embodiments, physical servers can run a shared kernel for hosting containers. In yet other embodiments, the physical server 208 can run other software for supporting other virtual partitioning approaches. Networks in accordance with various embodiments can include any number of physical servers hosting any number of virtual machines, containers, or other virtual partitions. Hosts can also comprise blade/physical servers without virtual machines, containers, or other virtual partitions, such as the servers 208a, 208c, 208d, and 208e.

The network environment 200 can also integrate a network monitoring system, such as the network monitoring system 100 shown in FIG. 1. For example, the network monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process log files and/or network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host can include multiple sensors 220 running on the host (e.g., the host sensor 220b) and various components of the host (e.g., the hypervisor sensor 220c and the VM sensor 220d) so that all (or substantially all) packets traversing the network environment 200 can be monitored. For example, if one of the VMs 218 running on the host 208b receives a first packet from the WAN 206, the first packet can pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

The network monitoring system 100 shown in FIG. 1 can be used to gather log files and other network data in order to generate analytics for networked entities and perform root cause analysis. Although FIG. 2 illustrates one network environment 200, in some embodiments, a network monitoring system may communicate with multiple network environments (e.g., other host platforms) and/or multiple network fabrics.

According to some embodiments, the network monitoring system may detect performance events associated with one of the functions, services, or applications supported by the networking environment. Performance events may be, for example, errors, notifications, performance metrics, a set of conditions that are met, or any other event detectable by the network monitoring system. The performance events may be received from a third party or by one of the sensors or derived from the data collected by the analytics engine. An example performance event may be, for example, server A not responding within X seconds, action B taking more than Y seconds to complete, CPU load for machine C reaching more than N percent for over Z seconds, or any other event or combination of events detectable by the network monitoring system. However, in many cases, it is difficult to efficiently identify a root cause of these performance events because of the complexity of the network environment and the vast amounts of data being generated in the network environment.

Aspects of the subject technology address these and other technical limitations by analyzing one or more log files to identify features of interest that may be correlated with a detected performance event. However, using log files in root cause analysis is also technically difficult. In some cases, log files may include information about error events that occur near in time to a detected performance event. However, it is uncertain whether the error event is the root cause of the performance event and a knowledgeable network administrator may be required to go line-by-line through the error log to identify which entries in the log file have particular meaning. Furthermore, prior knowledge of which errors may lead to which performance events may be needed. In other cases, log files may not include any error events and may simply include a record of seemingly unrelated information and/or metrics. Additionally, a performance event may not be correlated with a single entry in a log file, but a combination of events recorded in multiple entries across one or more log files. Traditional implementations are unable to identify such root causes.

Aspects of the subject technology address these and other technical limitations by analyzing log data in aggregate, including the log data in multiple log files, in order to automatically identify previously unknown features of interest that may be correlated with a particular performance event.

Figure 3:
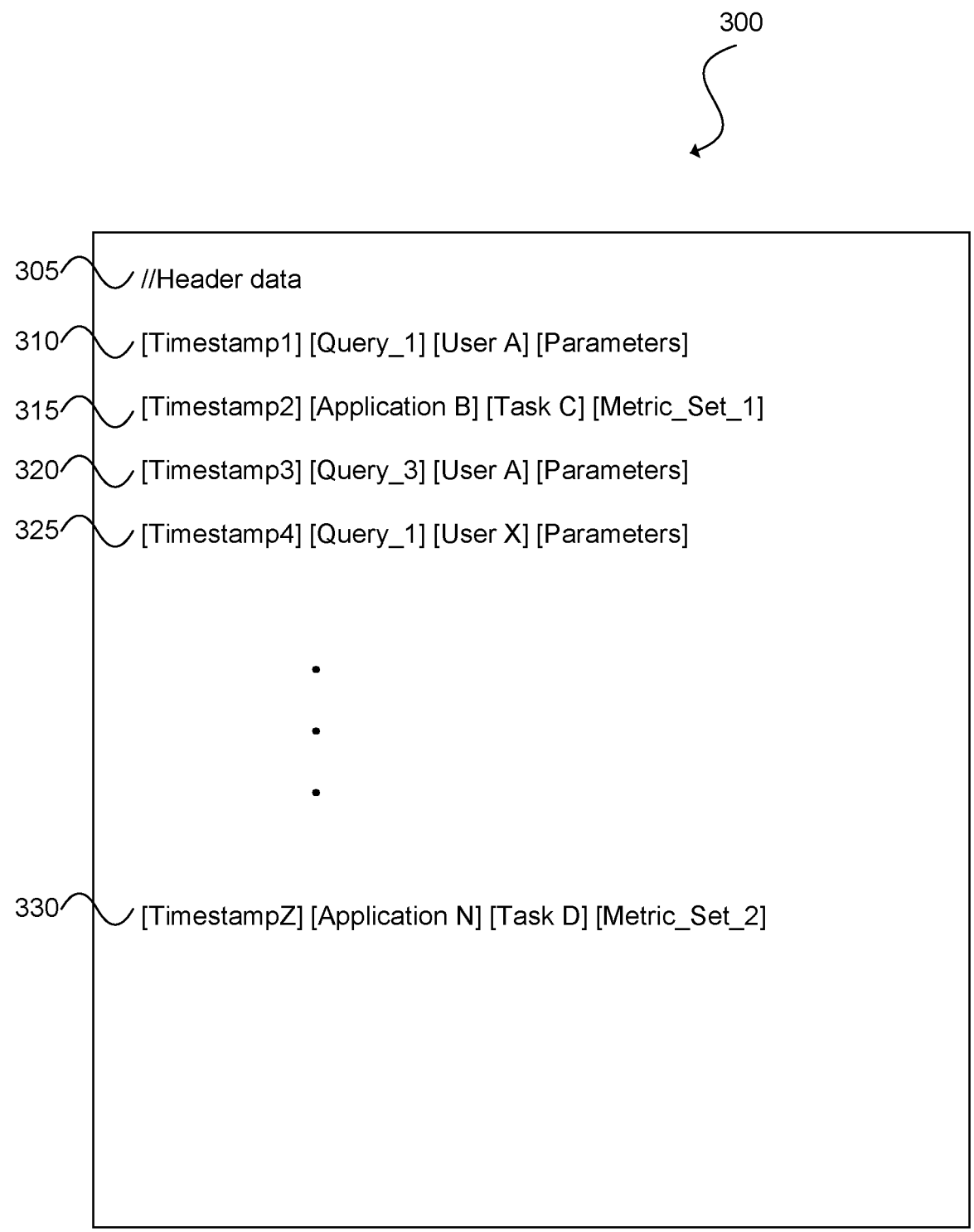
FIG. 3 illustrates an example log file, in accordance with an embodiment.

FIG. 3 illustrates an example log file 300, in accordance with an embodiment. The log file 300 is but one illustrative example of a log file and it is understood that log files can be of various different formats, contain different types of information, and serve different purposes (e.g., an application log, a web server log, an error log, etc.). Although log file 300 is in a structures form, the network monitoring system may also process log files in unstructured formats.

The example log file 300 of FIG. 3 contains header information 305 that may identify a source process, application, or machine that generated the log file 300, specify what type of information is kept in the log file, or provide any other information that may be useful or provide context. The log file 300 also includes a number of entries 310-330. Each entry may describe an event detected or monitored by the source process, application, or machine that generated the log file 300 and each event may be associated with a timestamp associated with when the event was detected or when the event occurred.

Events may include, for example, queries made by users and the parameters used in those queries. The user may be, for example, a user account, an application identifier, a process identifier, a machine identifier, an identifier for a networked entity, or an identifier for any other computing entity. Events may also include operational events that specify tasks performed by one or more applications (or other computing entities). Events may also include various metrics logged by the source process, application, or machine. The metrics may specify, for example, various computing metrics associated with the operation of a process or execution of a query. For example, a specific task performed by a particular application or a query may have taken a certain time to perform, used a specified amount of bandwidth or memory, created a certain number of database entries, etc.

The log file 300 of FIG. 3 is provided merely as an illustrative example. As noted above, log files may include various information and be in various formats, although typically textually in nature. A network monitoring system may be configured to analyze one or more of these log files in order to find correlations between certain features of interest in the log file and a performance event. These features of interest may be seemingly unrelated to the performance event. However, by analyzing all of the information in one or more log files in aggregate, rather than entry by entry, the network monitoring system is better able to identify previously unknown correlations between the features of interest and a performance event.

According to some embodiments, the network monitoring system may track the occurrences of certain features of interest in one or more log files in order to identify and monitor the frequency of certain features of interest over time. The network monitoring system may determine normal and abnormal levels for those features of interest and use those levels to determine whether a feature of interest is correlated with a detected performance event. A feature of interest may be, for example, a particular word/text, pattern or grouping of words/text. The words/text may represent one or more queries, users, applications, tasks, URLs, etc.

Figure 4:
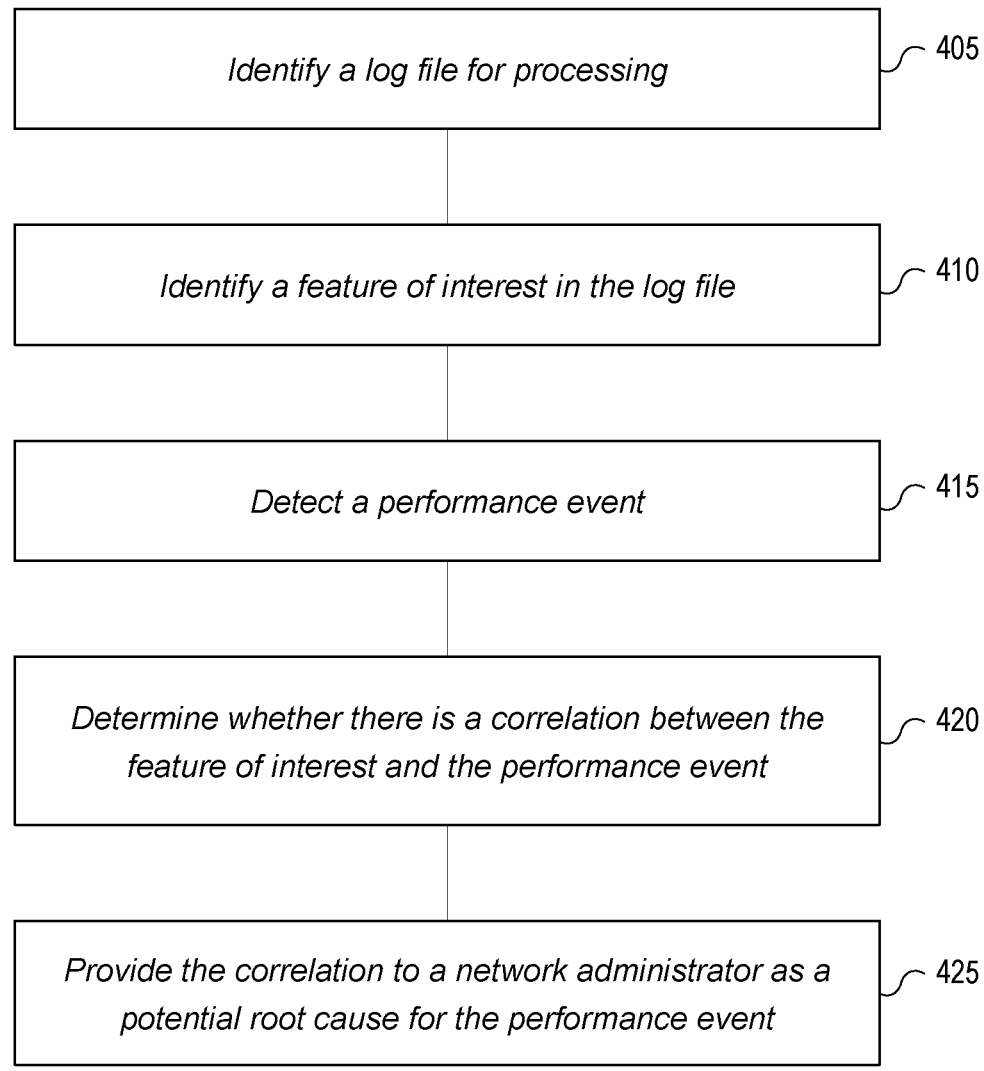
FIG. 4 shows an example process for identifying a root cause of a performance event, in accordance with various embodiments of the subject technology.

FIG. 4 shows an example process 400 for identifying a root cause of a performance event, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 400 can be performed by a network monitoring system or similar system.

At operation 405, the system identifies one or more log files for processing. In some embodiments, the one or more log files may be collected from the one or more sensors in the network environment. The sensors may be deployed on endpoints or other nodes in one or more networks and eventually provide the log files to an analytics engine for processing (e.g., via collectors and a data mover as illustrated in FIG. 1). The sensors may be able to identify which files are log files based on configuration data that includes known locations in the file system of the host device where log files are known to be stored and/or known file names for log files.

Sensors may also identify the log files based on a number of heuristics. For example, each sensor may track the activity of a host device, process, or other networked entity to identify the files that are accessed, the number of times each file is accessed, and the frequency of the access. Files that include only include text or are predominantly text that are accessed often and regularly may be identified as log files. Each sensor may also track the size of the log file over time to determine whether the size of the file is increasing and the rate at which the size of the file increases. A file that only increases or generally increases over time may be identified as a log file.

At operation 410, the system analyzes the log files to identify one or more features of interest in the log file. The feature of interest may be a pattern or a portion of a pattern. The pattern may be specified by input from a network administrator, a file, or some other source and be provided in the form of a regular expression specifying the pattern.

In some embodiments, the pattern may also be identified by tracking the entropy of the text of the log file and/or the words in the log file. For example, the system may determine that the text "user_ID:" occurs over a threshold number of times or threshold frequency in a log file and the text "user_ID:" is immediately followed by additional text that has greater entropy. Accordingly, the system may identify a pattern of "user_ID: $U" where "$U" is a variable for the user name/id as a feature of interest. Similarly, the system may determine that the text "query:" occurs over a threshold number of times or threshold frequency in a log file followed by additional text that has greater entropy. Accordingly, the system may identify a pattern of "query: $Q" where "$Q" is a variable value for the query name as a feature of interest. The system may determine that the text "query response time:" occurs over a threshold number of times or threshold frequency in a log file followed by additional text that has greater entropy. Accordingly, the system may identify a pattern of "query response time: $T" where "$T" is a variable value for a response time for a query as a feature of interest. Other patterns (e.g., URLs, timestamps, etc.) may also be recognized by the system and combinations of patterns (e.g., "[user_ID: $U] [query: $Q]") may also be recognized by the system. Additionally, the system may monitor multiple log files and monitor the log files over time to detect changes in frequency of the patterns.

Once a feature of interest in the log file is identified, the system may track the feature of interest over time and calculate a normal level or range for the feature of interest. The normal value or range may be a frequency for a feature of interest (e.g., an average number of occurrences for a feature of interest over a unit of time) or an average value for the feature of interest (e.g., the average response time). Abnormal levels or ranges may also be defined by the system.

As an illustrative example, "query: DBquery123" may be one identified feature of interest. The system may track how often "query: DBquery123" occurs in one or more log files. The system may, for example, determine how many instances of "query: DBquery123" occur every 5 minutes and compute an average number of occurrences for a given 5 minute period. The occurrences of a feature of interest may also be tracked over a longer time frame in order to determine a normal level for the feature of interest in general and/or for particular time periods (e.g., Mondays, Tuesdays, weekdays, weekends, afternoons, mornings, 3 pm on Fridays, etc.).

At operation 415, the system may detect a performance event. The performance event may be a problem or issue such as a service or networked entity becoming unreachable, the response time for a particular task exceeding a threshold amount of time, resource usage exceeding a threshold, or any other issue that a network administrator may wish to determine a root cause for. The threshold levels may be provided by a network administrator or determined by the system based on historical values (e.g., an average or a standard deviation from the norm) for the metric.

The system, at operation 420, may determine whether there is a correlation between the feature of interest and the performance event. For example, the performance event may be associated with a timestamp or other indication of when the performance event occurred. The system may determine if one of the monitored feature of interests are at levels that deviate from the norm. If the levels of a feature of interest are abnormal or otherwise exceed the normal range for that feature of interest at the same time or near the same time, the feature of interest may be correlated with the performance event.

For example, a performance event of a server request response exceeding 5 seconds may be detected by a system during a period of time. During the same period of time, the server may determine that the feature of interest "user_ID: Bob" were within normal parameters. However, the feature of interest "query: DBquery123" exceeded its normal range, reaching an abnormal level. Accordingly, the system may determine that the feature of interest "query: DBquery123" is correlated with the performance event. In some embodiments, multiple features of interest may be correlated with the performance event and the correlations between a feature of interest and a performance event may grow stronger if the correlation is detected multiple times over time. Once a correlation is established, the feature of interest may be provided to a network administrator as a possible root cause of the performance event at operation 425.

According to various aspects of the subject technology, machine learning techniques may be used to further enhance the capabilities of the system. For example, machine learning techniques may be used to help identify features of interest in a log file and/or identify correlations between features of interest and a performance event.

Figure 5A:
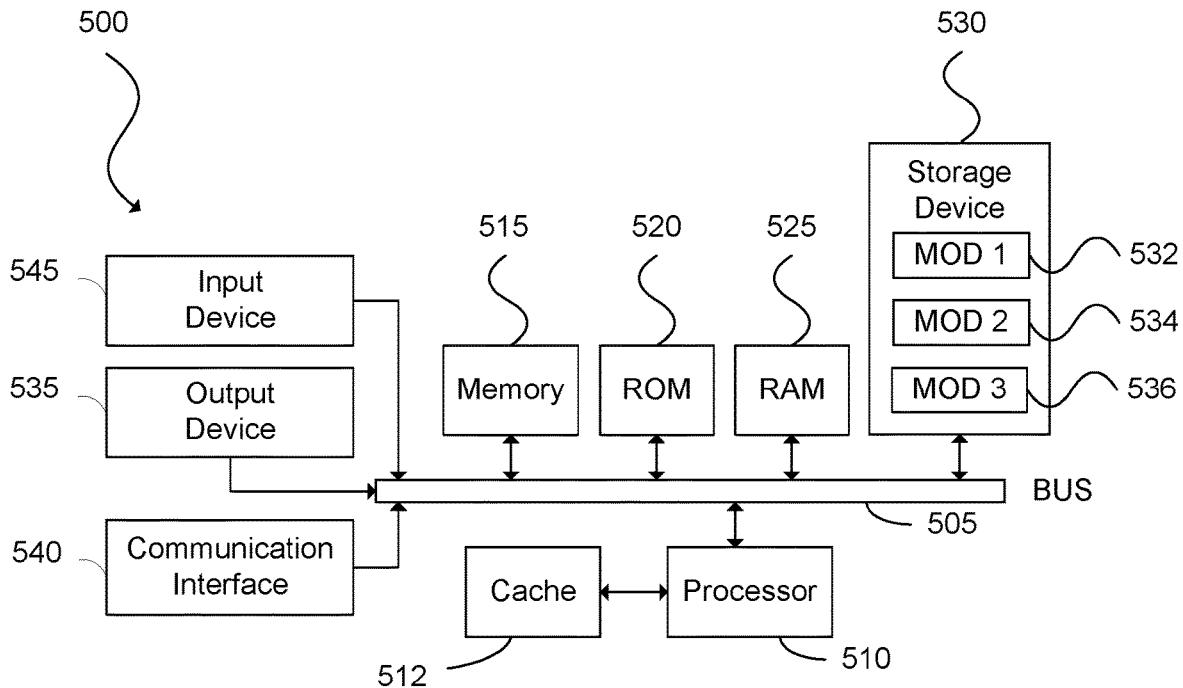
FIGS. 5A and 5B illustrate examples of systems in accordance with some embodiments.
Figure 5B:
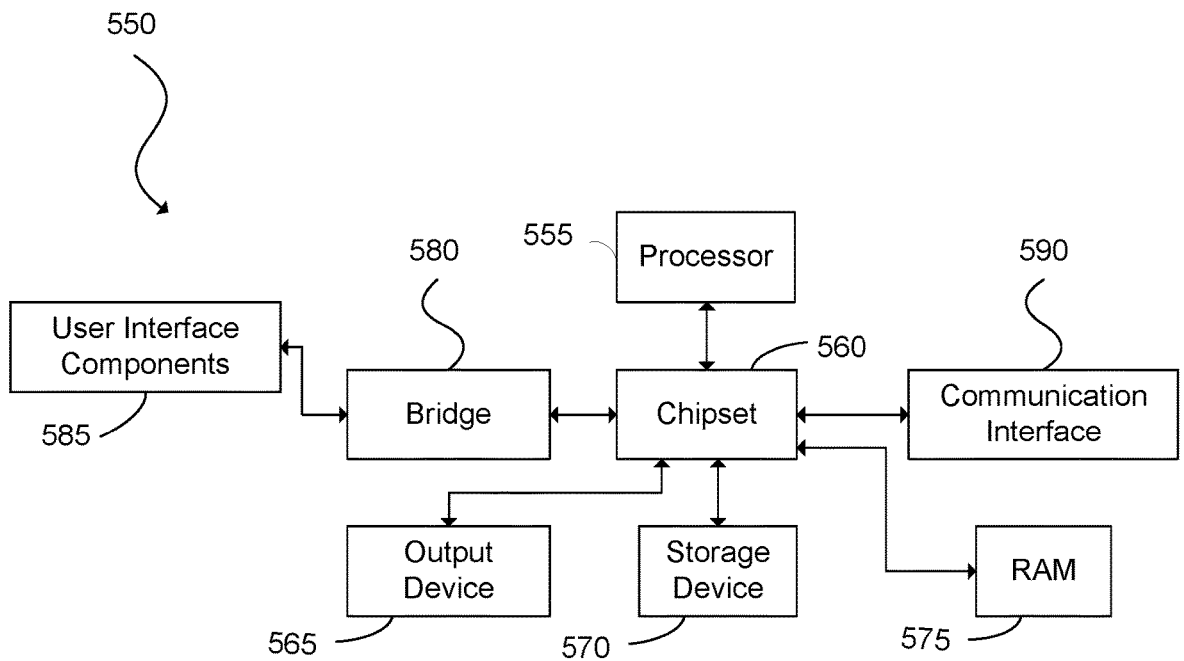

FIG. 5A and FIG. 5B illustrate systems in accordance with various embodiments.

The more appropriate system will be apparent to those of ordinary skill in the art when practicing the various embodiments. Persons of ordinary skill in the art will also readily appreciate that other systems are possible.

FIG. 5A illustrates an example architecture for a conventional bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) in a storage device 520 and random access memory (RAM) 525, to the processor 510. The computing system 500 can include a cache 512 of high-speed memory connected directly with, in close proximity to, or integrated as part of the processor 510. The computing system 500 can copy data from the memory 515 and/or the storage device 530 to the cache 512 for quick access by the processor 510. In this way, the cache 512 can provide a performance boost that avoids processor delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

Storage device 530 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out the function.

FIG. 5B illustrates an example architecture for a conventional chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, and solid state media, for example. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 555 analyzing data stored in the storage device 570 or the RAM 575. Further, the computing system 500 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving a number of log files from at least one network sensor distributed across a network environment;
identifying a feature of interest in the number of log files;
calculating an abnormal level for the feature of interest based on text data in the number of log files;
detecting that a performance event has occurred during a time period;
determining whether the feature of interest is at the abnormal level during the time period, wherein the abnormal level comprises a frequency value for the feature of interest or an average value for the feature of interest; and
identifying a correlation between the feature of interest and the performance event based on the determining.

2. The computer-implemented method of claim 1, further comprising:
providing the correlation to a network administrator as a potential root cause for the performance event.

3. The computer-implemented method of claim 2, further comprising:
transmitting the correlation to a client device associated with the network administrator.

4. The computer-implemented method of claim 1, wherein identifying the feature of interest comprises identifying, based on configuration data, a log file from the number of log files, wherein the feature of interest is identified in the log file, and wherein the configuration data comprises at least one known location for the log file or a known file name associated with the log file.

5. The computer-implemented method of claim 1, wherein identifying the feature of interest comprises identifying a log file from the number of log files containing the feature of interest, the method further comprising:
identifying the log file by determining that a machine accessed the log file, determining that a size of the log file has increased, and determining that the log file contains text data.

6. The computer-implemented method of claim 1, wherein identifying the feature of interest comprises identifying a log file from the number of log files, wherein the feature of interest is identified in the log file, and wherein the log file is identified by tracking an entropy of the log file or words in the log file over a period of time the abnormal level is a frequency value for a feature of interest.

7. The computer-implemented method of claim 1, wherein the performance event comprises a monitored metric exceeding a threshold level.

8. The computer-implemented method of claim 1, wherein the feature of interest is identified based on a pattern, and wherein the pattern is specified by a regular expression specifying the pattern.

9. A non-transitory computer-readable medium comprising instructions which, when executed by a computing system, cause the computing system to:
identify a feature of interest in a log file, wherein the feature of interest is identified based on a pattern, and wherein the pattern is specified by a regular expression specifying the pattern;
calculate an abnormal level for the feature of interest based on text data in the log file;
detect that a performance event has occurred during a time period;
determine whether the feature of interest is at the abnormal level during the time period, wherein the abnormal level comprises a frequency value for the feature of interest or an average value for the feature of interest
identify a correlation between the feature of interest and the performance event based on the determining whether the feature of interest is at the abnormal level.

10. The non-transitory computer-readable medium of claim 9, wherein the instructions further cause the computing system to:
receive, from a remote network sensor, the log file.

11. The non-transitory computer-readable medium of claim 9, wherein the instructions further cause the computing system to:
provide the correlation to a remote client device associated with a network administrator as a potential root cause for the performance event.

12. The non-transitory computer-readable medium of claim 9, wherein the instructions further cause the computing system to:
identify the log file based on configuration data comprising at least one known location for the log file or a known file name associated with the log file.

13. The non-transitory computer-readable medium of claim 9, wherein the instructions further cause the computing system to:
identify the log file based by determining that a machine accessed the log file, determining that a size of the log file has increased, and determining that the log file contains text data.

14. A system comprising:
one or more processors; and
at least one non-transitory computer-readable storage medium having stored therein instructions which, when executed by the one or more processors, cause the one or more processors to:
receive a number of log files from one or more host entities distributed across a network environment;
identify a feature of interest in the number of log files;
calculate an abnormal level for the feature of interest based on text data in the number of log files;
detect that a performance event has occurred during a time period; and
determine whether the feature of interest is at the abnormal level during the time period, wherein the abnormal level comprises a frequency value for the feature of interest or an average value for the feature of interest; and
identify a correlation between the feature of interest and the performance event based the determining whether the feature of interest is being at the abnormal level during the time period.

15. The system of claim 14, further comprising a network interface configured to provide the correlation to a network administrator as a potential root cause for the performance event.

16. The system of claim 14, wherein the feature of interest is identified in a log file from the number of log files, the at least one non-transitory computer-readable storage medium stores instructions which, when executed by the one or more processors, cause the one or more processors to identify the log file based on configuration data comprising at least one known location for the log file or a known file name associated with the log file.

17. The system of claim 14, wherein the feature of interest is identified in a log file from the number of log files, the at least one non-transitory computer-readable storage medium stores instructions which, when executed by the one or more processors, cause the one or more processors to identify the log file by determining that a machine accessed the log file, determining that a size of the log file has increased, and determining that the log file contains text data.

18. The system of claim 14, wherein the at least one non-transitory computer-readable storage medium stores instructions which, when executed by the one or more processors, cause the one or more processors to provide performance data for the one or more host entities to an analytics engine, and wherein the performance event is detected based on the performance data.

19. The system of claim 14, wherein the feature of interest is identified based on a pattern provided by a network administrator.

20. The system of claim 14, wherein the feature of interest is identified based on analysis of the text data in the number of log files.

* * * * *